US012598074B2

(12) United States Patent
Hong et al.

(10) Patent No.: US 12,598,074 B2
(45) Date of Patent: Apr. 7, 2026

(54) FACIAL RECOGNITION METHOD AND APPARATUS, DEVICE, AND MEDIUM

(71) Applicant: Tencent Technology (Shenzhen) Company Limited, Shenzhen (CN)

(72) Inventors: Zheming Hong, Shenzhen (CN); Xiaoyi Zhang, Shenzhen (CN); Wei Zhao, Shenzhen (CN); Jun Wang, Shenzhen (CN); Xukang Peng, Shenzhen (CN); Shaoming Wang, Shenzhen (CN); Runzeng Guo, Shenzhen (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 492 days.

(21) Appl. No.: 17/990,310

(22) Filed: Nov. 18, 2022

(65) Prior Publication Data

US 2023/0100954 A1 Mar. 30, 2023

Related U.S. Application Data

(63) Continuation of application No. PCT/CN2022/080096, filed on Mar. 10, 2022.

(30) Foreign Application Priority Data

Apr. 20, 2021 (CN) .......................... 202110426038.5

(51) Int. Cl.
*G06F 21/32* (2013.01)
*G06F 18/25* (2023.01)
(Continued)

(52) U.S. Cl.
CPC ............ *H04L 9/3231* (2013.01); *G06V 10/12* (2022.01); *G06V 10/50* (2022.01); *G06V 10/56* (2022.01);
(Continued)

(58) Field of Classification Search
CPC .... H04L 9/3231; G06V 10/806; G06V 10/12; G06V 10/56; G06V 40/168;
(Continued)

(56) References Cited

U.S. PATENT DOCUMENTS

2019/0108396 A1* 4/2019 Dal Mutto ............. G06V 20/52
2022/0109574 A1* 4/2022 Narumanchi ........... G06N 3/09

FOREIGN PATENT DOCUMENTS

CN 109948467 A 6/2019
CN 111274883 A 6/2020
(Continued)

OTHER PUBLICATIONS

Min, Rui et al. "Kinectfacedb: A kinect database for face recognition." IEEE, 2014 (Year: 2014).*
(Continued)

*Primary Examiner* — Oneal R Mistry
*Assistant Examiner* — Nhut Huy Pham
(74) *Attorney, Agent, or Firm* — Crowell & Moring LLP

(57) ABSTRACT

This application discloses a facial recognition method and apparatus, a device and a medium, which relates to the field of image processing. The method includes: fusing a color map and a depth map of a facial image to obtain a fused image of the facial image, the fused image including two-dimensional information and depth information of the facial image (202); dividing the fused image into blocks to obtain at least two image blocks of the fused image (204); irreversibly shuffling pixels in the at least two image blocks to obtain a pixel-confused facial image (206); and determining an object identifier corresponding to the facial image according to the pixel-confused facial image (208).

19 Claims, 6 Drawing Sheets

Fuse a color map and a depth map of a facial image to obtain a fused image of the facial image, the fused image including two-dimensional information and depth information of the facial image — 202

Divide the fused image into blocks to obtain at least two image blocks of the fused image — 204

Irreversibly shuffle pixels in the at least two image blocks to obtain a pixel-confused facial image — 206

Determine an object identifier corresponding to the facial image according to the pixel-confused facial image — 208

(51) Int. Cl.

| | | |
|---|---|---|
| *G06Q 20/40* | (2012.01) | |
| *G06V 10/12* | (2022.01) | |
| *G06V 10/50* | (2022.01) | |
| *G06V 10/56* | (2022.01) | |
| *G06V 10/77* | (2022.01) | |
| *G06V 10/774* | (2022.01) | |
| *G06V 10/80* | (2022.01) | |
| *G06V 20/64* | (2022.01) | |
| *G06V 40/16* | (2022.01) | |
| *H04L 9/32* | (2006.01) | |

(52) U.S. Cl.
CPC ........ *G06V 10/7715* (2022.01); *G06V 10/774* (2022.01); *G06V 10/806* (2022.01); *G06V 40/162* (2022.01); *G06V 40/168* (2022.01); *G06V 40/172* (2022.01)

(58) Field of Classification Search
CPC ............. G06V 10/7715; G06V 40/172; G06V 40/162; G06V 10/50; G06V 10/774
See application file for complete search history.

(56) References Cited

FOREIGN PATENT DOCUMENTS

| | | | | |
|---|---|---|---|---|
| CN | 112052834 A | * | 12/2020 | ............. G06N 3/045 |
| CN | 112329004 A | | 2/2021 | |
| CN | 112634337 A | | 4/2021 | |
| CN | 112668383 A | | 4/2021 | |
| CN | 113762033 A | | 12/2021 | |

OTHER PUBLICATIONS

Mikhelson, Ilya V., et al. "Automatic, fast, online calibration between depth and color cameras." Journal of Visual Communication and Image Representation 25.1 (2014): 218-226. (Year: 2014).*
International Search Report and Written Opinion for PCT/CN2022/080096 mailed May 26, 2022 including translation of International Search Report and Written Opinion (15 pages).
Chinese-language Office Action issued in Chinese Application No. 202110426038.5 dated Jul. 30, 2025, with English translation (22 pages).
Juyong, Zhang et al.; "Multimodal face recognition based on color and depth information", Journal of Wuhan University (Engineering Edition), dated Apr. 2020, pp. 353-363, vol. 4, No. 53, English abstract only (11 pages).

* cited by examiner

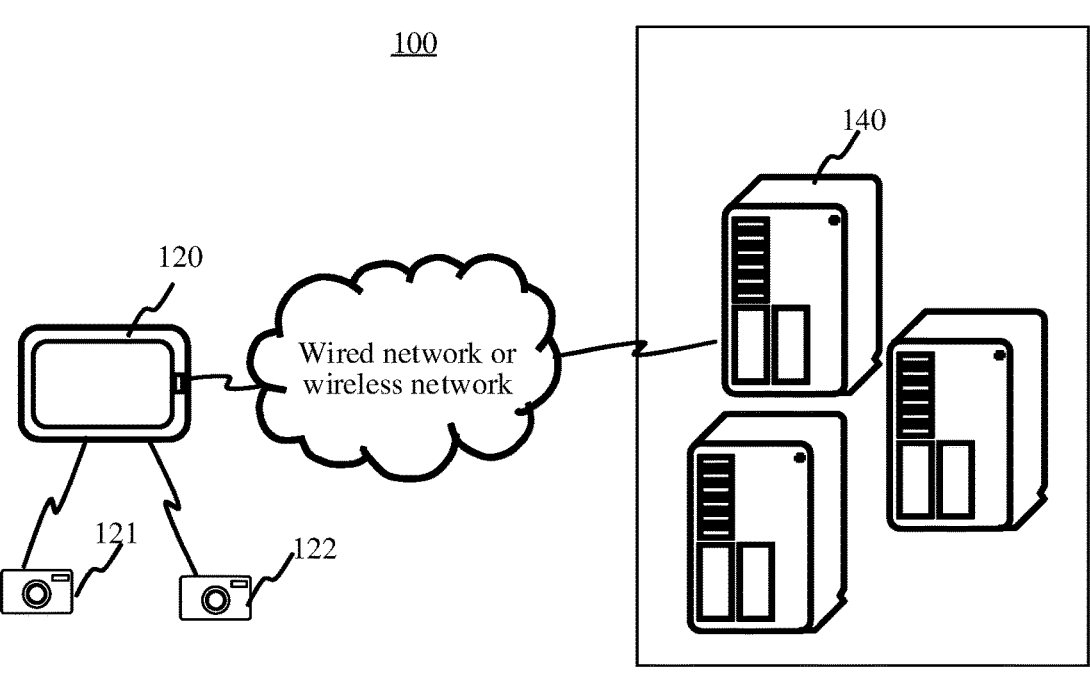

FIG. 1

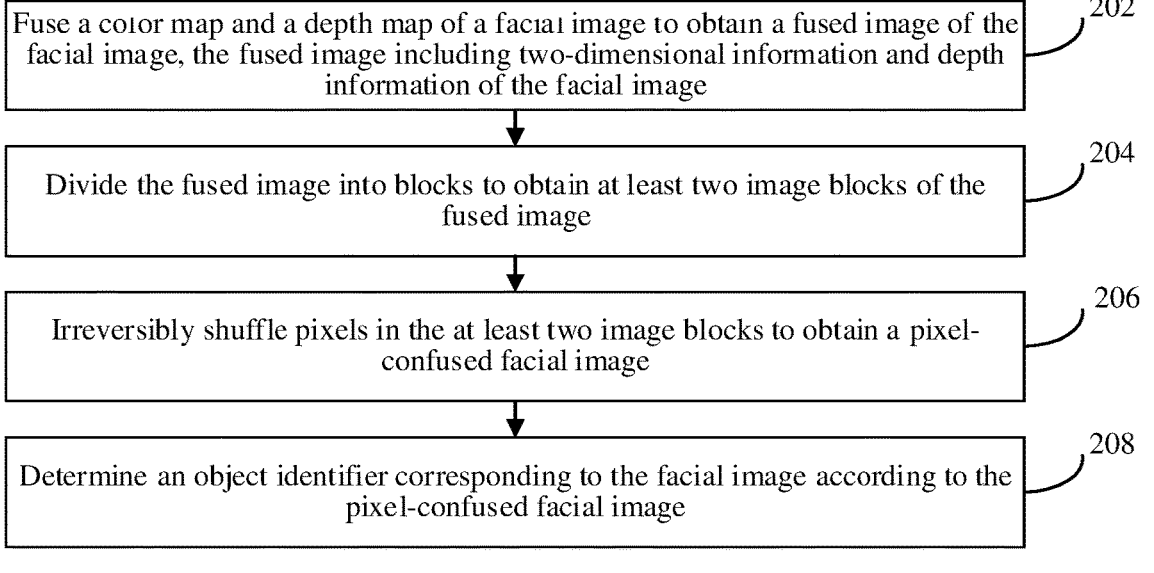

| | |
|---|---|
| Fuse a color map and a depth map of a facial image to obtain a fused image of the facial image, the fused image including two-dimensional information and depth information of the facial image | 202 |
| Divide the fused image into blocks to obtain at least two image blocks of the fused image | 204 |
| Irreversibly shuffle pixels in the at least two image blocks to obtain a pixel-confused facial image | 206 |
| Determine an object identifier corresponding to the facial image according to the pixel-confused facial image | 208 |

FIG. 2

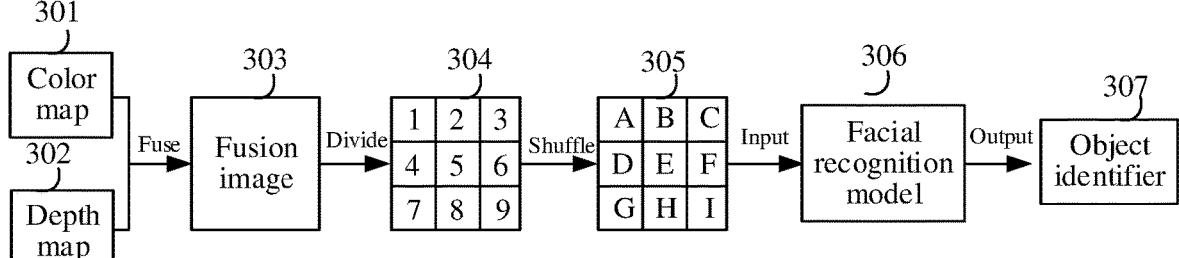

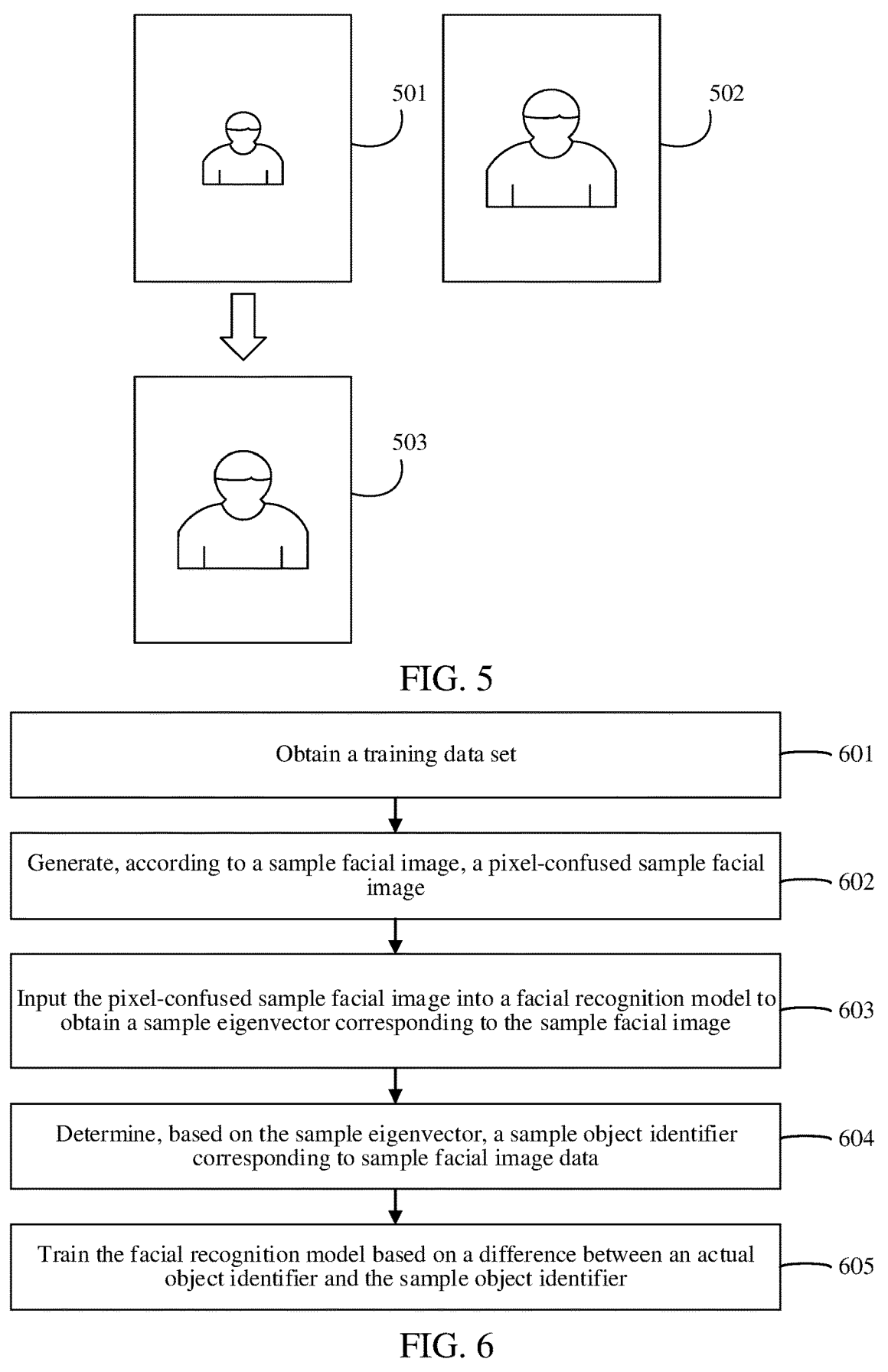

| Obtain a training data set | 601 |

| Generate, according to a sample facial image, a pixel-confused sample facial image | 602 |

| Input the pixel-confused sample facial image into a facial recognition model to obtain a sample eigenvector corresponding to the sample facial image | 603 |

| Determine, based on the sample eigenvector, a sample object identifier corresponding to sample facial image data | 604 |

| Train the facial recognition model based on a difference between an actual object identifier and the sample object identifier | 605 |

FIG. 6

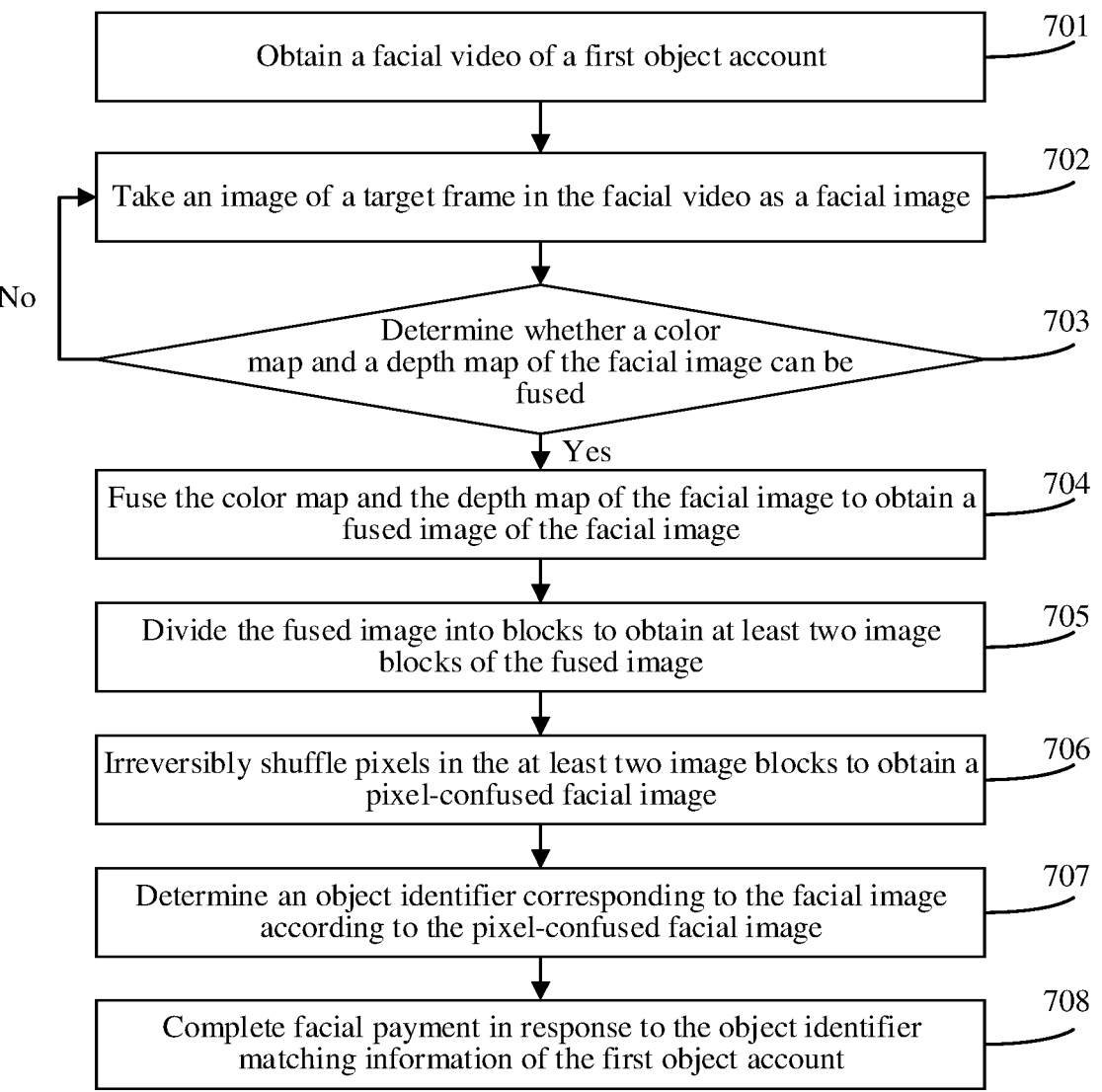

Obtain a facial video of a first object account — 701

Take an image of a target frame in the facial video as a facial image — 702

Determine whether a color map and a depth map of the facial image can be fused — 703

No

Yes

Fuse the color map and the depth map of the facial image to obtain a fused image of the facial image — 704

Divide the fused image into blocks to obtain at least two image blocks of the fused image — 705

Irreversibly shuffle pixels in the at least two image blocks to obtain a pixel-confused facial image — 706

Determine an object identifier corresponding to the facial image according to the pixel-confused facial image — 707

Complete facial payment in response to the object identifier matching information of the first object account — 708

FIG. 7

FACIAL RECOGNITION METHOD AND APPARATUS, DEVICE, AND MEDIUM

RELATED APPLICATION

This application is a continuation of International Patent Application No. PCT/CN2022/080096, filed Mar. 10, 2022, which claims priority to Chinese Patent Application No. 202110426038.5, entitled "HUMAN FACE RECOGNITION METHOD AND APPARATUS, DEVICE, AND MEDIUM", and filed on Apr. 20, 2021. The contents of International Patent Application No. PCT/CN2022/080096 and Chinese Patent Application No. 202110426038.5 are each incorporated herein by reference in their entirety.

FIELD OF THE TECHNOLOGY

This application relates to the field of image processing, and in particular, to a facial recognition method and apparatus, a device, and a medium.

BACKGROUND OF THE DISCLOSURE

Facial recognition is a biometric recognition technology of identification based on facial feature information. In the process of facial recognition, if there is no information protection measure, biometric feature information of an object may be leaked.

In the related art, by obtaining a video of the object, taking one or several frames of a two-dimensional facial image in the video, performing Arnol mapping (also referred to as cat mapping) on the facial image, and shuffling pixels in the facial image to obtain a pixel-confused facial image, thereby protecting object information. Then an eigenvector corresponding to the pixel-confused facial image is obtained by inputting the pixel-confused facial image into a facial recognition model, and then an object identifier is determined from a database according to the eigenvector.

In the related art, when recognizing the facial image of the object, only two-dimensional information in the facial image of the object can be protected, and the amount of information to be protected is limited.

SUMMARY

Embodiments of this application provide a facial recognition method and apparatus, a device and a medium. The method encrypts depth information and two-dimensional information in a facial image at the same time to ensure that object information will not be leaked. The technical solutions are as follows:

According to an aspect of this application, a facial recognition method is provided. The method includes:

fusing a color map and a depth map of a facial image to obtain a fused image of the facial image, the fused image including two-dimensional information and depth information of the facial image;

dividing the fused image into blocks to obtain at least two image blocks of the fused image;

irreversibly shuffling pixels in the at least two image blocks to obtain a pixel-confused facial image; and determining an object identifier corresponding to the facial image according to the pixel-confused facial image.

According to another aspect of this application, a facial recognition apparatus is provided. The apparatus includes:

a fusion module, configured to fuse a color map and a depth map of a facial image to obtain a fused image of the facial image, the fused image including two-dimensional information and depth information of the facial image;

a dividing module, configured to divide the fused image into blocks to obtain at least two image blocks of the fused image;

a shuffling module, configured to irreversibly shuffle pixels in the at least two image blocks to obtain a pixel-confused facial image; and a recognition module, configured to determine an object identifier corresponding to the facial image according to the pixel-confused facial image.

In an optional design of this application, the fusion module is further configured to obtain a first feature point in the color map and a second feature point in the depth map, where the first feature point has a correspondence to the second feature point; and fuse, in response to an overlapping degree of the first feature point and the second feature point being less than a preset value, the color map and the depth map to obtain the fused image of the facial image.

In an optional design of this application, the fusion module is further configured to obtain, in response to a field of view of the color map being the same as a field of view of the depth map, the first feature point in the color map and the second feature point in the depth map.

In an optional design of this application, the fusion module is further configured to obtain first internal and external parameters of a first camera corresponding to the color map and second internal and external parameters of a second camera corresponding to the depth map, where the first camera is configured to capture the color map and the second camera is configured to capture the depth map; and control, according to the first internal and external parameters and the second internal and external parameters, the field of view of the color map to be the same as the field of view of the depth map.

In an optional design of this application, the dividing module is further configured to uniformly divide the fused image into blocks to obtain the at least two image blocks of equal size of the fused image.

In an optional design of this application, the shuffling module is further configured to perform cat mapping on the pixels in the at least two image blocks to obtain pixel change coordinates in the at least two image blocks; and obtain, based on the pixel change coordinates in the at least two image blocks, the pixel-confused facial image.

In an optional design of this application, the recognition module is further configured to obtain a third feature point in the fused image; encrypt the third feature point to obtain encrypted feature point data; transmit the encrypted feature point data and the pixel-confused facial image to a server; and receive the object identifier returned by the server, where the object identifier is obtained by the server according to decrypted encrypted feature point data and the pixel-confused facial image.

In an optional design of this application, the recognition module is further configured to input the pixel-confused facial image and the third feature point in the fused image into a facial recognition model to obtain an eigenvector corresponding to facial image data; and determine, based on the eigenvector, the object identifier corresponding to the facial image.

In an optional design of this application, the recognition module is further configured to obtain, in response to satisfying an identifier matching failure condition, the object identifier corresponding to the facial image; use the pixel-confused facial image and the encrypted feature point data as target facial image data; and save the target facial image data and the object identifier.

In an optional design of this application, the apparatus further includes a training module;

the training module is configured to obtain a training data set, where the training data set includes a sample facial image and an actual object identifier, and the sample facial image has a correspondence to the actual object identifier; generate, according to the sample facial image, a pixel-confused sample facial image; input the pixel-confused sample facial image into the facial recognition model to obtain a sample eigenvector corresponding to the sample facial image; determine, based on the sample eigenvector, a sample object identifier corresponding to sample facial image data; and train the facial recognition model based on a difference between the actual object identifier and the sample object identifier.

According to another aspect of this application, a computer device is provided. The computer device includes: a processor and a memory, the memory storing at least one instruction, at least one program, a code set, or an instruction set, the at least one instruction, the at least one program, the code set, or the instruction set being loaded and executed by the processor to implement the facial recognition method described in the foregoing aspect.

According to another aspect of this application, a computer-readable storage medium is provided, storing at least one piece of program code, the at least one piece of program code being loaded and executed by a processor to implement the facial recognition method described in the foregoing aspect.

According to another aspect of this application, a computer program product or a computer program is provided, including computer instructions, the computer instructions being stored in a computer-readable storage medium. A processor of a computer device reads the computer instructions from the computer-readable storage medium, and executes the computer instructions, to cause the computer device to perform the facial recognition method described in the foregoing aspect.

The technical solutions provided in the embodiments of this application include at least the following beneficial effects:

A fused image obtained by aligning and fusing a color map and a depth map of a facial image includes both two-dimensional information and depth information. After the fused image is divided into blocks, each pixel in the fused image can be better processed. After image blocks are shuffled, the two-dimensional information and the depth information in the fused image are protected, so that the two-dimensional information and the depth information cannot be restored, that is, information of an object is protected from being leaked. In addition, an object identifier can be determined according to a pixel-confused facial image, which will not affect the application of a basic facial recognition function.

BRIEF DESCRIPTION OF THE DRAWINGS

FIG. 1 is a schematic structural diagram of a computer system according to an exemplary embodiment of this application.

FIG. 2 is a schematic flowchart of a facial recognition method according to an exemplary embodiment of this application.

FIG. 3 is a schematic diagram of a facial recognition method according to an exemplary embodiment of this application.

FIG. 5 is a schematic diagram of controlling field of views to be the same according to an exemplary embodiment of this application.

FIG. 6 is a schematic flowchart of a training method for a facial recognition model according to an exemplary embodiment of this application.

FIG. 7 is a schematic flowchart of a facial recognition method according to an exemplary embodiment of this application.

DESCRIPTION OF EMBODIMENTS

Figure 4:
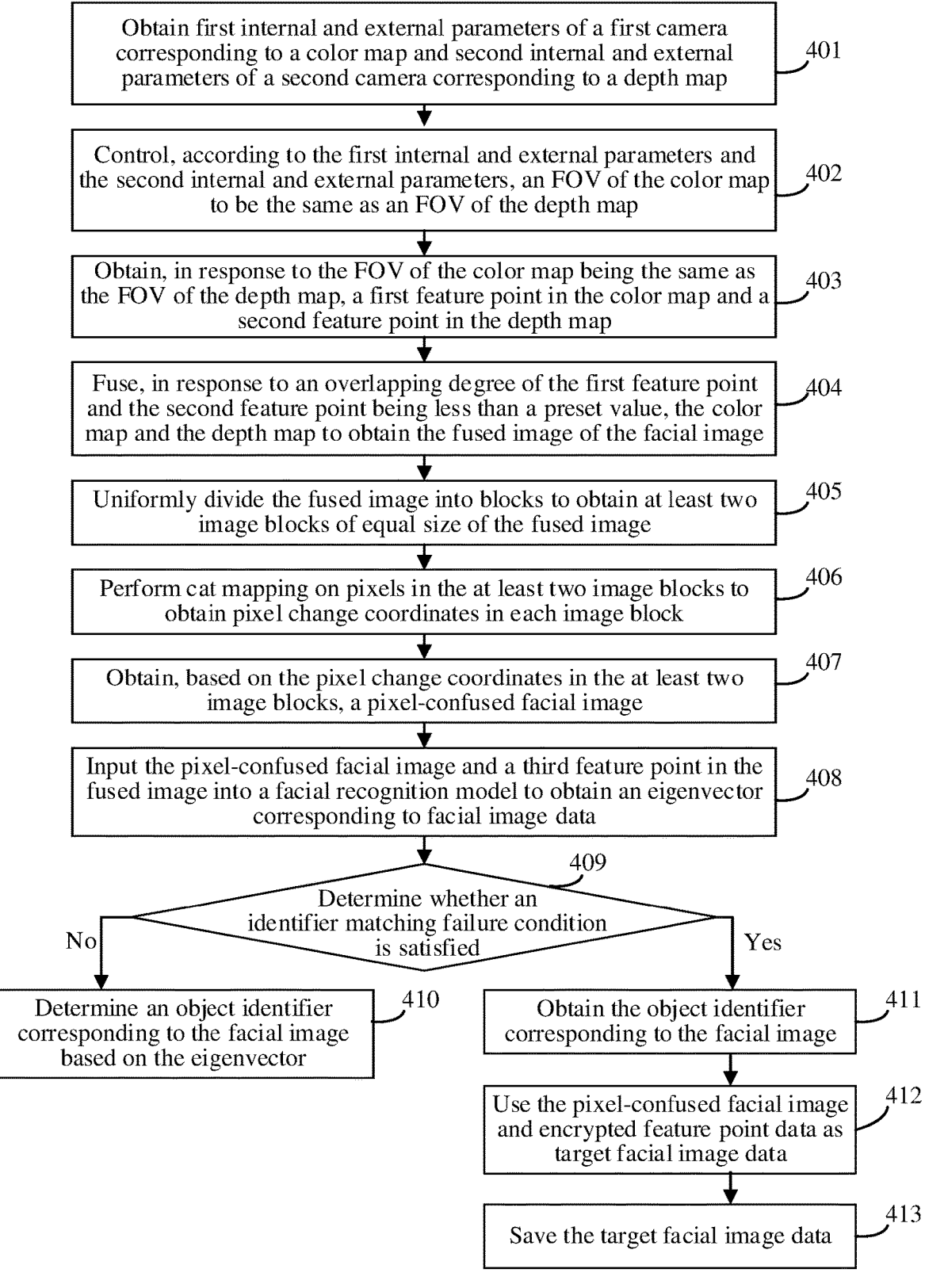
FIG. 4 is a schematic flowchart of a facial recognition method according to an exemplary embodiment of this application.

First, terms involved in the embodiments of this application are introduced:

Artificial Intelligence (AI): AI is a theory, method, technology and application system that uses digital computers or machines controlled by digital computers to simulate, extend and expand human intelligence, perceive the environment, acquire knowledge, and use knowledge to obtain the best results. In other words, AI is a comprehensive technology in computer science. This technology attempts to understand the essence of intelligence and produce a new intelligent machine that can react in a manner similar to human intelligence. AI is to study design principles and implementation methods of various intelligent machines, so that the machines have the functions of perception, reasoning, and decision-making.

AI technology is a comprehensive discipline, covering a wide range of fields including both a hardware-level technology and a software-level technology. Basic AI technologies generally include technologies such as a sensor, a dedicated AI chip, cloud computing, distributed storage, a big data processing technology, an operating/interaction system, and electromechanical integration. AI software technologies mainly include a computer vision technology, a speech processing technology, a natural language processing (NLP) technology, machine learning (ML)/deep learning, and the like.

Computer Vision (CV) Technology: CV is a science that studies how to use a machine to "see", and furthermore, that uses a camera and a computer to replace human eyes to perform machine vision such as recognition and measurement on an object, and further perform graphic processing, so that the computer processes the object into an image more suitable for human eyes to observe, or an image transmitted to an instrument for detection. As a scientific discipline, the CV studies related theories and technologies and attempts to establish an AI system that can obtain information from images or multidimensional data. The CV technologies generally include technologies such as image processing, image recognition, image semantic understanding, image retrieval, optical character recognition (OCR), video processing, video semantic understanding, video content/behavior recognition, three-dimensional object reconstruction, a 3D technology, virtual reality, augmented reality, synchronous positioning, and map construction, and further include biometric feature recognition technologies such as common facial recognition.

With the research and progress of the AI technology, the AI technology is studied and applied in a plurality of fields such as a common smart home, a smart wearable device, a virtual assistant, a smart speaker, smart marketing, unmanned driving, automatic driving, an unmanned aerial vehicle, a robot, smart medical care, and smart customer service. It is believed that with the development of technologies, the AI technology will be applied to more fields, and play an increasingly important role.

Color Map: A color map is an image obtained by collecting natural light and performing an imaging operation. For example, the color map is generally used for facial comparison recognition in the face scan payment, etc.

Depth Map: In three-dimensional computer graphics and computer vision, a depth map is an image or an image channel including information related to a distance from a surface of a scene object to a viewpoint. Each pixel of the depth map represents a vertical distance between a plane of the depth camera and a plane of a to-be-captured object, which is usually represented by 16-bit data, and the unit is millimeters. For example, the depth map is generally used for living body detection, face comparison recognition, and the like in the face scan payment.

Infrared Map: An infrared map is an image obtained by collecting infrared light and performing an imaging operation. For example, the infrared map is generally used for living body detection, and the like in the face scan payment.

RGB Image (R represents red; G represents green; and B represents blue) An RGB image refers to an image obtained according to an RGB color mode. The RGB color mode is a color standard in the industry. It obtains various colors by changing three color channels of red, green, and blue and superimposing the three colors on each other. RGB represents colors of the three channels of red, green, and blue. This standard includes almost all colors that can be perceived by human vision, and is one of the most widely used color systems at present.

Depth Map: In three-dimensional computer graphics, a depth map is an image or an image channel including information related to a distance to a surface of a scene object at a viewpoint. The depth map is similar to a grayscale image, except that each of its pixel values is an actual distance from a sensor to an object.

RGBD Image (R represents red; G represents green; B represents blue; and D represents depth): An RGBD image is formed by an RGB image and a depth map. The RGB image and the depth map are registered, so there is a one-to-one correspondence between pixels. Therefore, the pixels in the RGB image and the depth map can be combined to generate an RGBD image.

Divide and Shuffle: In image processing, divide and shuffle is an important data encryption technology and can be used as an effective security enhancement means.

Facial Eigenvector Facial eigenvector includes facial feature information and digital feature information, which is often used for facial similarity comparison in facial recognition.

Facial Feature Point: A facial feature point refers to a preset point on a face of a living being. Optionally, the facial feature point includes at least one of a facial left eye feature point, a facial right eye feature point, a facial nose tip feature point, a facial left lip corner feature point, and a facial right lip corner feature point.

Field of View (FOV): A FOV refers to an angle formed by two sides of a maximum range of an object image of a measured target that can pass through lens with a photographing device as a vertex. The FOV determines the FOV of the photographing device, and the greater the FOV is, the greater the viewing angle range is. In other words, when an object is not in the FOV, the object is not captured by the photographing device.

Internal and External Parameters: In the embodiments of this application, internal and external parameters refer to internal and external parameters of a camera, including internal parameters and external parameters. The internal parameters are parameters related to characteristics of the camera itself, including: 1/dx, 1/dy, u0, v0, r, f, where dx and dy indicate how many units of length a pixel occupies in x and y directions, that is, the size of an actual physical value represented by a pixel; u0 and v0 represent differences in the number of horizontal and vertical pixels between center pixel coordinates of the image and original pixel coordinates of the image; r represents an aperture radius of the camera; and f represents a focal length of the camera. The external parameters are parameters related to a coordinate system of the camera. The external parameters include $\omega$, $\delta$, $\theta$, Tx, Ty, and Tz, where $\omega$, $\delta$, and $\theta$ are used for representing rotation parameters of the three axes of the three-dimensional coordinate system; and Tx, Ty, and Tz are used for representing translation parameters of the three axes of the three-dimensional coordinate system.

Cat Mapping: Cat mapping, also referred to as Arnold mapping, is proposed by the Russian mathematician Vladimir Igorevich Arnold. This is a chaotic mapping method that performs repeated folding and stretching transformations in a limited area, and is generally used in multimedia chaotic encryption. Arnold is a relatively main scrambling algorithm, and the algorithm is generated by the following transformation formula:

$$\begin{bmatrix} x_{n+1} \\ y_{n+1} \end{bmatrix} = \begin{bmatrix} ab+1 & -b \\ -a & 1 \end{bmatrix} \begin{bmatrix} x_n \\ y_n \end{bmatrix} \mod(N);$$

where a, b and N are positive integers, which can be set by a technician; $x_n$ and $y_n$ are an abscissa and an ordinate of a pixel before cat mapping; $x_{n+1}$ and $y_{n+1}$ are an abscissa and an ordinate of a pixel after cat mapping; and mod ( ) is a modulo operation. When $x_n$ and $y_n$ are any real number, cat mapping is chaotic mapping.

FIG. 1 is a schematic structural diagram of a computer system according to an exemplary embodiment of this application. The computer system 100 includes: a terminal 120 and a server 140.

A camera 121 and a camera 122 are installed on the terminal 120. The camera 121 is configured to capture a color map and the camera 122 is configured to capture a depth map. The camera 121 is connected to the terminal 120 in a wired or wireless manner, and transmits the color map to the terminal 120. The camera 122 is connected to the terminal 120 in a wired or wireless manner, and transmits the depth map to the terminal 120. An application program that relates to facial recognition is installed on the terminal 120. The application program may be a mini program in an application (app), a specialized application, or a web client.

For example, an object performs an operation related to facial recognition on the terminal 120. For example, if the object is going to use a face payment function, in order to ensure safety and reliability of the payment process, it is necessary to perform living body detection on a facial image obtained by the terminal 120 to prevent a transaction caused by an illegal attack and protect interests of individuals and the public. The terminal 120 may be at least one of a smartphone, a tablet computer, an e-book reader, an MP3 player, an MP4 player, a laptop portable computer and a desktop computer.

The terminal 120 is connected to the server 140 by using a wireless network or a wired network.

The server 140 may be an independent physical server, or may be a server cluster or a distributed system formed by a plurality of physical servers, or may be a cloud server that provides a basic cloud computing service such as a cloud service, a cloud database, cloud computing, a cloud function, cloud storage, a network service, cloud communication, a middleware service, a domain name service, a security service, a content delivery network (CDN), big data and an artificial intelligence platform. The server 140 is configured to provide a background service to a facial recognition application, and transmit a result of living body detection to the terminal 120. Optionally, the server 140 is responsible for primary computing work, and the terminal 120 is responsible for secondary computing work. Alternatively, the server 140 is in charge of secondary computing work, and the terminal 120 is in charge of primary computing work. Alternatively, a distributed computing architecture is adopted between the server 140 and the terminal 120 to perform collaborative computing. In the embodiments of this application, each step is independently performed by the terminal 120, or each step is independently performed by the server 140, or each step is jointly performed by the terminal 120 and the server 140.

The information (including but not limited to user equipment information, user personal information, and the like), data (including but not limited to data for analysis, stored data, displayed data, and the like) and signals involved in this application are both authorized by the user or fully authorized by all parties, and the collection, use and processing of relevant data need to comply with relevant laws, regulations and standards of relevant countries and regions. For example, the facial image and the object identifier involved in this application are all obtained with full authorization.

FIG. 2 is a schematic flowchart of a facial recognition method according to an exemplary embodiment of this application. The method may be performed by the terminal 120 or other computer devices shown in FIG. 1. Before performing the method shown in FIG. 2, the terminal 120 or other computer devices further obtains authorized color maps and depth maps of facial images. In event that the facial images include faces of users, the facial images are images that are authorized to be used by the users. In event that the facial image includes a face of an animal, the source of the facial image meets relevant laws, regulations and standards of relevant countries and regions. The method shown in FIG. 2 includes:

Step 202: Fuse a color map and a depth map of a facial image to obtain a fused image of the facial image, the fused image including two-dimensional information and depth information of the facial image.

In this application, the facial image refers to an image including at least one face of at least one living being. For example, an image presents two faces of two cats and one face of a dog. All embodiments of this application do not specifically limit what kind of living being the face in the biological image belongs to. Any examples involving the feature point of the face below are simple examples for the convenience of understanding, and should not be construed as a limitation on the face. The feature point of the face can be determined by technicians themselves or can be a feature point that are conventionally established in the related industry.

Optionally, the facial image includes one or more faces. Optionally, when the facial image includes a plurality of faces, a face with the largest area is used as a to-be-recognized face. Optionally, when the facial image includes a plurality of faces, a face in a preset area is used as a to-be-recognized face. For example, when the facial image includes a plurality of faces, a face located in a central area is used as a to-be-recognized face. Optionally, when the facial image includes a plurality of faces, a face whose picture quality meets a preset standard is used as a to-be-recognized face. The picture quality includes at least one of definition, brightness, grayscale, contrast and resolution. Optionally, the facial image is taken from a video.

The color map refers to an RGB image of the facial image, and each pixel in the RGB image records two-dimensional information. Optionally, the two-dimensional information includes at least one of color information, location information, brightness information and grayscale information. For example, a pixel in the RGB image will occupy 24 bits of data, where 8 bits represents the R component, 8 bits represents the G component and 8 bits represents the D component.

The depth map is configured to record depth information of the facial image, and each pixel in the depth map records the depth information. The depth information represents a vertical distance between a photographing device and a photographed face. For example, a pixel in the depth map will occupy 16 bits of data.

The depth map and the color map are registered, so there is a one-to-one correspondence between pixels in the two images, and a same data format is used when the pixels in the depth map and the color map record data. Therefore, corresponding pixels in the depth map and the color map can be recombined to obtain corresponding pixels in the fused image. For example, if a pixel in the RGB image occupies 24 bits of data, and a pixel in the depth map occupies 16 bits of data, data corresponding to two corresponding pixels are recombined, and data of the corresponding pixels in the two images are superimposed to obtain pixels in the fused image. The pixels in the fused image will occupy 40 bits of data.

Optionally, the fused image refers to an RGBD image. The RGBD image is formed by an RGB image and a depth map. Each pixel in the RGBD image records both two-dimensional information and depth information. For example, a pixel in the RGBD image will occupy 40 bits of data, where 8 bits represents the R component, 8 bits represents the G component, 8 bits represents the D component and 16 bits represents the H component.

For example, as shown in FIG. 3, a color map 301 and a depth map 302 are fused to obtain a fused image 303.

Step 204: Divide the fused image into blocks to obtain at least two image blocks of the fused image.

Optionally, uniformly divide the fused image into blocks to obtain image blocks of equal size of the fused image. For example, the fused image is divided into 9 image blocks of the same size through a 9*9 grid structure.

Optionally, the fused image is divided into blocks to obtain image blocks of the fused image, and sizes of the image blocks are different. For example, a 36*36 fused image is divided into blocks to obtain one 36*18 image block and two 18*18 image blocks.

For example, as shown in FIG. 3, the fused image 303 is uniformly divided into blocks to obtain an image block 304. The image block 304 has nine image blocks in total, which are respectively distinguished by numbers 1, 2, 3, 4, 5, 6, 7, 8, and 9. For example, "1" in FIG. 3 represents an image block 1, "2" represents an image block 2, and so on.

Step 206: Irreversibly shuffle pixels in the at least two image blocks to obtain a pixel-confused facial image.

Irreversible shuffling refers to the inability to restore a pixel-confused facial image to a fused image. This step is to irreversibly shuffle the image blocks of the fused image, rather than irreversibly shuffle the fused image. For example, the fused image is divided into blocks to obtain an image block 1 and an image block 2, pixels in the image block 1 and pixels in the image block 2 are irreversibly shuffled.

Optionally, the pixels in the image block are sequentially and irreversibly shuffled to obtain a pixel-confused facial image. For example, the fused image is divided into blocks to obtain an image block 1, an image block 2 and an image block 3. Pixels in the image block 1 are first irreversibly shuffled, and then pixels in the image block 2 are irreversibly shuffled, finally, pixels in the image block 3 are irreversibly shuffled.

Optionally, the pixels in the image block are simultaneously irreversibly shuffled to obtain a pixel-confused facial image.

For example, each of the image blocks in the image block 304 is irreversible shuffled to obtain a pixel-confused facial image 305. To illustrate the difference between before and after shuffled, the pixel-confused facial image 305 is also divided into blocks to obtain 9 image blocks, which are respectively distinguished by numbers A, B, C, D, E, F, G, H, and I. For example, "A" in FIG. 3 represents an image block A, "B" represents an image block B, and so on. In addition, the image block 304 has a correspondence to the pixel-confused facial image 305. The image block 1 is shuffled to obtain an image block A, the image block 2 is shuffled to obtain an image block B, the image block 3 is shuffled to obtain an image block C, and so on.

Step 208: Determine an object identifier corresponding to the facial image according to the pixel-confused facial image.

In this embodiment, the object identifier is configured to mark an object with the face. That is, the object identifier is merely configured to establish a mapping relationship between the facial image and the object by the terminal device or other computer devices. Optionally, the object identifier can also be understood as other information of the object with the face. For example, if the face is a dog face, the object identifier may be the breed, origin, living habits and the like of the dog.

In all the embodiments of this application, the object identifiers stored in advance by the server have been authorized by the user, and the collection, use and processing of the object identifiers have complied with relevant laws, regulations and standards of relevant countries and regions. Optionally, the pixel-confused facial image is input into a facial recognition model and an object identifier corresponding to the facial image is determined according to the output of the facial recognition model. If the facial recognition model is not sensitive to whether the pixels of the facial image are shuffled, a pixel-confused facial image is used for training the facial recognition model, and a facial recognition model obtained by this training method can obtain an object identifier.

For example, as shown in FIG. 3, the pixel-confused facial image 305 is input into a facial recognition model 306, and the object identifier 307 is output by the facial recognition model 306.

In conclusion, in this embodiment, a fused image obtained by aligning and fusing a color map and a depth map of a facial image includes both two-dimensional information and depth information. After the fused image is divided into blocks, each pixel in the fused image can be better processed. After image blocks are shuffled, the two-dimensional information and the depth information in the fused image are protected, so that the two-dimensional information and the depth information cannot be restored, that is, information of an object is protected from being leaked. In addition, an object identifier can be determined according to a pixel-confused facial image, which will not affect the application of a basic facial recognition function.

In the following embodiment, on the one hand, it is determined whether the depth map and the color map can be fused through the feature points in the depth map and the color map, so that the obtained fused image can better fit an actual face, on the other hand, an object identifier is obtained through a facial recognition model. Since the facial recognition model is not sensitive to whether pixels of the facial image are shuffled, the facial recognition model can obtain a more accurate object identifier. In addition, the image blocks are irreversibly shuffled by cat mapping, so that two-dimensional information and depth information in the fused image cannot be restored, which ensures that information of the object will not be leaked and enhances the security.

FIG. 4 is a schematic flowchart of a facial recognition method according to an exemplary embodiment of this application. The method may be performed by the terminal 120 or other computer devices shown in FIG. 1. The method includes the following steps: In the optional embodiment shown in FIG. 4, both the processed color map and depth map of the facial image are fully authorized images. In event that the facial image includes a face of a user, the facial image is an image that are authorized to be used by the user. In event that the facial image includes a face of an animal, the source of the facial image meets relevant laws, regulations and standards of relevant countries and regions. The method shown in FIG. 4 includes:

Step 401: Obtain first internal and external parameters of a first camera corresponding to a color map and second internal and external parameters of a second camera corresponding to a depth map.

The first internal and external parameters include internal parameters and external parameters of the first camera.

The second internal and external parameters include internal parameters and external parameters of the second camera.

Optionally, the first camera and the second camera are the same camera, or the first camera and the second camera are different cameras.

Optionally, the first internal and external parameters and the second internal and external parameters are obtained by referring to factory parameters of the first camera and the second camera.

Optionally, the first internal and external parameters and the second internal and external parameters are obtained through a checkerboard marking method.

Step 402: Control, according to the first internal and external parameters and the second internal and external parameters, an FOV of the color map to be the same as an FOV of the depth map.

Optionally, according to the first internal and external parameters and the second internal and external parameters, the FOV of the color map is kept unchanged, and the FOV of the depth map is adjusted so that the FOV of the color map is the same as the FOV of the depth map.

Optionally, according to the first internal and external parameters and the second internal and external parameters, the FOV of the depth map is kept unchanged, and the FOV of the color map is adjusted so that the FOV of the color map is the same as the FOV of the depth map.

For example, as shown in FIG. 5, a color map 501 and a depth map 502 are facial images with different FOVs. AN FOV of the depth map 502 is kept unchanged, and an FOV of the color map 501 is adjusted to obtain a color map 503. AN FOV of the color map 503 is equal to the FOV of the depth map 502.

Step 403: Obtain, in response to the FOV of the color map being the same as the FOV of the depth map, a first feature point in the color map and a second feature point in the depth map.

When the FOV of the color map and the FOV of the depth map are the same, the color map and the depth map have the same spatial coordinate system, and the size of the color map and the depth map are the same. For example, sizes of the color map and the depth map are both 100 unit length*100 unit length.

The first feature point is a point preset by a technician in the color map, and the first feature point may be one or a plurality of points. Optionally, the first feature point includes at least one of a facial left eye feature point, a facial right eye feature point, a facial nose tip feature point, a facial left lip corner feature point, and a facial right lip corner feature point in the color map. The first feature point may further be another point in the color map, which is not specifically limited in this application.

The second feature point is a point preset by a technician in the depth map, and the second feature point may be one or a plurality of points. Optionally, the second feature point includes at least one of a facial left eye feature point, a facial right eye feature point, a facial nose tip feature point, a facial left lip corner feature point, and a facial right lip corner feature point in the depth map. The second feature point may further be another point in the depth map, which is not specifically limited in this application.

The first feature point has a correspondence to the second feature point. For example, if the first feature point is a facial left eye feature point in the color map, the second feature point is a facial left eye feature point in the depth map.

Optionally, the first feature point and the second feature point are determined through a feature point extraction model.

Step 404: Fuse, in response to an overlapping degree of the first feature point and the second feature point being less than a preset value, the color map and the depth map to obtain the fused image of the facial image.

The color map and the depth map with the same FOV have the same spatial coordinate system, so it can be determined whether pixels coincide by comparing coordinates of the two.

Optionally, the first feature point forms a first feature frame, and the second feature point forms a second feature frame, the color map and the depth map are fused in response to the number of non-overlapping pixels of a first feature frame and a second feature frame being less than a preset value to obtain the fused image of the facial image. The first feature frame is obtained by connecting the first feature points with a smooth curve, and the first feature frame passes through a plurality of pixels on the color map. The second feature frame is obtained by connecting the second feature points with a smooth curve, and the second feature frame passes through a plurality of pixels on the depth map. Optionally, non-coincidental pixels of the first feature frame and the second feature frame are determined by the coordinates of the pixels.

For example, if it is assumed that a preset value is 10, the first feature point forms the first feature frame, the second feature point forms the second feature frame, the first feature frame has 60 pixels, the second feature frame also has 60 pixels, there are 56 overlapping pixels on the first feature frame and the second feature frame, and there are 5 non-overlapping pixels, then the color map and the depth map are fused to obtain a fused image of the facial image.

Optionally, the color map and the depth map are fused in response to a relative distance between the first feature point and the second feature point being less than a preset value to obtain the fused image of the facial image. Optionally, the relative distance between the first feature point and the second feature point is determined through the coordinates of the pixels.

For example, if it is assumed that a preset value is 6, coordinates of the first feature point in the color map are (10, 10), coordinates of the second feature point in the depth map are (13, 14), then a relative distance between the first feature point and the second feature point is calculated to bey $\sqrt{(13-10)^2+(14-10)^2}=5$, so the color map and the depth map are fused to obtain a fused image of the facial image.

The depth map and the color map are registered, so there is a one-to-one correspondence between pixels in the two images, and a same data format is used when the pixels in the depth map and the color map record data. Therefore, corresponding pixels in the depth map and the color map can be recombined to obtain corresponding pixels in the fused image. For example, if a pixel in the color map occupies 24 bits of data, and a pixel in the depth map occupies 16 bits of data, data corresponding to two corresponding pixels are recombined, and data of the corresponding pixels in the two images are superimposed to obtain pixels in the fused image. The pixels in the fused image will occupy 40 bits of data.

Step 405: Uniformly divide the fused image into blocks to obtain image blocks of equal size of the fused image.

The image block is either a rectangular or a triangular. For example, if it is assumed that the size of the fused image is 10*10, then the fused image is uniformly divided into four 5*5 image blocks. For example, if it is assumed that the size of the fused image is 10*10, then the fused image is uniformly divided into 8 image blocks of isosceles right triangles, and the waist length of the 8 isosceles right triangles is 5.

Optionally, the fused image is divided into blocks through a grid structure to obtain image blocks of equal size of the fused image. For example, the fused image is divided into blocks through a 9*9 grid structure to obtain 9 image blocks of the same size of the fused image.

Optionally, the fused image is divided into blocks to obtain image blocks of the fused image, and sizes of the image blocks are different.

Step 406: Perform cat mapping on pixels in at least two image blocks to obtain pixel change coordinates in the at least two image blocks.

Optionally, a plurality of cat mapping is performed on the pixels in the at least two image blocks to obtain pixel change coordinates in the at least two image blocks.

For example, if it is assumed that coordinates of pixels before cat mapping are $(x_n, y_n)$ and pixel change coordinates after cat mapping are $(x_{n+1}, y_{n+1})$, then:

$$\begin{bmatrix} x_{n+1} \\ y_{n+1} \end{bmatrix} = \begin{bmatrix} ab+1 & -b \\ -a & 1 \end{bmatrix} \begin{bmatrix} x_n \\ y_n \end{bmatrix} \mod(N);$$

where a, b and N are positive integers, which can be set by a technician; and mod( ) is a modulo operation.

Pixel change coordinates represent coordinates of the pixel after cat mapping. For example, original coordinates of the pixel are (1, 5), and after cat mapping, pixel change coordinates are obtained as (2, 8).

Step 407: Obtain, based on the pixel change coordinates in the at least two image blocks, a pixel-confused facial image.

Optionally, data corresponding to the pixels before cat mapping is mapped to the pixel change coordinates to obtain the pixel-confused facial image. For example, coordinates of a pixel 1 before cat mapping are (1, 5), and the pixel 1 carries data A. Cat mapping is performed on the pixel 1 to obtain pixel change coordinates as (2, 8), and transfer the data A of the pixel 1 to the pixel change coordinates (2, 8).

Step 408: Input the pixel-confused facial image and a third feature point in the fused image into a facial recognition model to obtain an eigenvector corresponding to facial image data.

Optionally, the third feature point is determined based on the first feature point and the second feature point. In event that the color map and the depth map are aligned, coordinates of the first feature point, the second feature point, and the third feature point are the same. For example, if the coordinates of the first feature point are (1, 5), the coordinates of the second feature point are (1, 5), the coordinates of the third feature point are (1, 5).

Optionally, the third feature point is determined based on the fused image. Optionally, the third feature point includes at least one of a facial left eye feature point, a facial right eye feature point, a facial nose tip feature point, a facial left lip corner feature point, and a facial right lip corner feature point in the fused image.

The input of the facial recognition model is the pixel-confused facial image and the third feature point, and the output is an eigenvector.

Optionally, the eigenvector is represented in the form of an array. For example, a 16-bit array is used for representing the eigenvector.

Optionally, a server inputs the pixel-confused facial image and the third feature point in the fused image into a facial recognition model to obtain an eigenvector corresponding to facial image data. To ensure that the information of the object is not leaked, the third feature point can be encrypted, and the process includes the following steps:

1. Obtain a third feature point in the fused image.

Optionally, the third feature point includes at least one of a facial left eye feature point, a facial right eye feature point, a facial nose tip feature point, a facial left lip corner feature point, and a facial right lip corner feature point in the fused image.

Optionally, the third feature point in the fused image is obtained through a feature point extraction model.

2. Encrypt the third feature point to obtain encrypted feature point data.

Optionally, coordinates of the third feature point are encrypted by a key to obtain the encrypted feature point data.

Optionally, the coordinates of the third feature point are obtained; and a feature point array is generated according to the coordinates of the third feature point, and the feature point array is encrypted to obtain the encrypted feature point data. For example, the coordinates of the third feature point are obtained as (1, 5), (8, 9) and (4, 7), the feature point array {1, 5, 8, 9, 4, 7} is obtained, and the feature point array is encrypted by the key to obtain the encrypted feature point data as {g, q, 5, i, 7, 0}.

3. Transmit the encrypted feature point data and the pixel-confused facial image to a server.

A terminal transmits the encrypted feature point data and the pixel-confused facial image to a server.

4. Receive an object identifier returned by the server.

The object identifier is obtained by the server according to the decrypted encrypted feature point data and the pixel-confused facial image. After decrypting the encrypted feature point data, the third feature point is obtained.

Optionally, the server inputs the decrypted encrypted feature point data and the fused image into a facial recognition model to obtain an eigenvector corresponding to facial image data; and the object identifier corresponding to the facial image is determined based on the eigenvector.

Step 409: Determine whether an identifier matching failure condition is satisfied.

If the identifier matching failure condition is not satisfied, perform step 410; and if the identifier matching failure condition is satisfied, perform step 411.

The identifier matching failure condition is used for determining whether the object identifier corresponding to the eigenvector exists. For example, when the object identifier matching the eigenvector is queried from a database, it is considered that the identifier matching failure condition is not satisfied; and when the object identifier matching the eigenvector is not queried from a database, it is considered that the identifier matching failure condition is satisfied.

In the embodiment shown in FIG. 4, the object identifiers pre-stored in the database have been authorized by the user, and the collection, use and processing of the object identifiers have complied with relevant laws, regulations and standards of relevant countries and regions.

Step 410: Determine the object identifier corresponding to the facial image based on the eigenvector.

The eigenvector has a correspondence to the object identifier. For example, an object identifier and an eigenvector corresponding to the object identifier are stored in a memory, and the object identifier is queried through the eigenvector.

Optionally, the object identifier includes the eigenvector.

Step 411: Obtain the object identifier corresponding to the facial image.

Obtain, in response to satisfying an identifier matching failure condition, the object identifier corresponding to the facial image.

Optionally, in response to satisfying the identifier matching failure condition, the object identifier corresponding to the facial image is obtained according to object input data. The object input data is obtained through an input operation of the object, and the input method includes but is not limited to at least one of voice input, text input, and image input.

Step 412: Use the pixel-confused facial image and encrypted feature point data as target facial image data.

The encrypted feature point data refers to data obtained by encrypting the third feature point.

Step 413: Save the target facial image data and the object identifier.

Optionally, the target facial image data and the object identifier are saved in a local storage.

Optionally, the target facial image data, the eigenvector and the object identifiers are stored in the database through steps 411-413.

In conclusion, in this embodiment, a fused image obtained by aligning and fusing a color map and a depth map of a facial image includes both two-dimensional information and depth information. After the fused image is divided into blocks, each pixel in the fused image can be better processed. After image blocks are shuffled, the two-dimensional information and the depth information in the fused image are protected, so that the two-dimensional information and the depth information cannot be restored, that is, information of an object is protected from being leaked. In addition, an object identifier can be determined according to a pixel-confused facial image, which will not affect the application of a basic facial recognition function.

In addition, encryption processing is performed on the third feature point in the fused image, which further improves the security, so that the information of the object will not be leaked. Cat mapping is further used for shuffling the image block of the fused image to ensure that two-dimensional information and depth information in the image block will not be restored.

In addition, a facial recognition model is used for determining the object identifier, so that the obtained object identifier is more accurate and the correct rate is higher.

In the following embodiment, since the facial recognition model is used in the previous embodiment to determine the eigenvector corresponding to the facial image, the facial recognition model needs to be trained to ensure that an output result of the facial recognition model is accurate.

FIG. 6 is a schematic flowchart of a training method for a facial recognition model according to an exemplary embodiment of this application. The method may be performed by the terminal 120 or the server 140 or other computer devices shown in FIG. 1. The method includes the following steps:

Step 601: Obtain a training data set.

The training data set includes a sample facial image and an actual object identifier, and the sample facial image has a correspondence to the actual object identifier.

Optionally, the sample facial image includes one or more faces.

Optionally, when the sample facial image includes a plurality of faces, a face with the largest area is used as a to-be-trained face.

Optionally, when the sample facial image includes a plurality of faces, a face in a preset area is used as a to-be-trained face. For example, when the sample facial image includes a plurality of faces, a face located in a central area is used as a to-be-trained face.

Optionally, when the sample facial image includes a plurality of faces, a face whose picture quality meets a preset standard is used as a to-be-trained face. The picture quality includes at least one of definition, brightness, grayscale, contrast and resolution.

In all the embodiments of this application, the training data set has been authorized by the user, and the collection, use and processing of related data have complied with relevant laws, regulations and standards of relevant countries and regions.

Step 602: Generate, according to the sample facial image, a pixel-confused sample facial image.

Optionally, the step includes the following sub-steps:

1. Fuse a color map and a depth map of a sample facial image to obtain a fused image of the sample facial image.

The fused image includes two-dimensional information and depth information of the facial image.

The depth map and the color map are registered, so there is a one-to-one correspondence between pixels in the two images, and a same data format is used when the pixels in the depth map and the color map record data. Therefore, corresponding pixels in the depth map and the color map can be recombined to obtain corresponding pixels in the fused image.

2. Divide the fused image into blocks to obtain image blocks of the fused image.

Optionally, the fused image is uniformly divided into blocks to obtain image blocks of equal size of the fused image.

Optionally, the fused image is divided into blocks to obtain image blocks of the fused image, and sizes of the image blocks are different.

3. Irreversibly shuffle pixels in the at least two image blocks to obtain a pixel-confused sample facial image.

Optionally, the pixels in the image block are sequentially and irreversibly shuffled to obtain a pixel-confused facial image.

Optionally, the pixels in the image block are simultaneously irreversibly shuffled to obtain a pixel-confused facial image.

Step 603: Input the pixel-confused sample facial image into a facial recognition model to obtain a sample eigenvector corresponding to the sample facial image.

Optionally, the pixel-confused sample facial image and a third feature point in the fused image are input into a facial recognition model to obtain an eigenvector corresponding to facial image data.

Optionally, the eigenvector is represented in the form of an array. For example, a 16-bit array is used for representing the eigenvector.

Step 604: Determine, based on the sample eigenvector, a sample object identifier corresponding to sample facial image data.

The eigenvector has a correspondence to the object identifier. For example, an object identifier and an eigenvector corresponding to the object identifier are stored in a memory, and the object identifier is queried through the eigenvector.

Optionally, the object identifier includes the eigenvector.

Step 605: Train the facial recognition model based on a difference between an actual object identifier and the sample object identifier.

Optionally, based on a difference between the actual object identifier and the sample object identifier, the facial recognition model is trained by using an error backpropagation method.

To sum up, this embodiment provides a training method for a facial recognition model, and the facial recognition model obtained by training can better identify a mapping relationship between a pixel-confused sample facial image and an eigenvector. Moreover, the trained facial recognition model is transferable and can be used on different computer devices.

Facial recognition is applicable to a wide range of scenarios. For example, facial recognition is used in real-world scenarios such as pet claiming, facial payment, an access control system, employee attendance, identity verification, and a security system. However, as facial information is a kind of private information, once the facial information is leaked, the privacy of the object will also be seriously violated. Therefore, it is necessary to protect the facial information in the process of facial recognition to prevent the privacy of the object from being violated. Therefore, a scene of facial payment is used as an example to illustrate.

FIG. 7 is a schematic flowchart of a facial recognition method according to an exemplary embodiment of this application. The method may be performed by the terminal 120 or other computer devices shown in FIG. 1. In the optional embodiment shown in FIG. 7, the facial image and the object identifier are authorized by the user, and the collection, use and processing of the facial image have complied with relevant laws, regulations and standards of relevant countries and regions.

The method includes the following steps:

Step 701: Obtain a facial video of a first object account.

The first object account refers to an account held by an object who uses facial payment.

Optionally, the facial video of the first object account is obtained through a camera; or the facial video of the first object account is downloaded through a network; or the facial video of the first object account transmitted by another computer device is received; or the facial video of the first object account is read from the local storage.

Step 702: Take an image of a target frame in the facial video as a facial image.

The target frame is any frame in the facial image. For example, there are 60 frames in the facial video, and the 24th frame of the 60 frames is taken as the target frame.

Step 703: Determine whether a color map and a depth map of the facial image can be fused.

If the color map and the depth map of the facial image can be fused, perform step 704; and If the color map and the depth map of the facial image cannot be fused, return to step 702.

Optionally, a first feature point of the color map and a second feature point of the depth map are obtained; and it is determined whether an overlapping degree of the first feature point and the second feature point is determined is less than a preset value, if the overlapping degree of the first feature point and the second feature point is less than the preset value, perform step 704; and if the overlapping degree of the first feature point and the second feature point is less than the preset value, return to step 702.

Step 704: Fuse the color map and the depth map of the facial image to obtain a fused image of the facial image.

The color map refers to an RGB image of the facial image, and each pixel in the RGB image records two-dimensional information. Optionally, the two-dimensional information includes at least one of color information, location information, brightness information and grayscale information.

The depth map is configured to record depth information of the facial image, and each pixel in the depth map records the depth information. The depth information represents a vertical distance between a photographing device and a photographed face.

The depth map and the color map are registered, so there is a one-to-one correspondence between pixels in the two images, and a same data format is used when the pixels in the depth map and the color map record data. Therefore, corresponding pixels in the depth map and the color map can be recombined to obtain corresponding pixels in the fused image.

Optionally, the fused image refers to an RGBD image. The RGBD image is formed by an RGB image and a depth map. Each pixel in the RGBD image records both two-dimensional information and depth information.

Step 705: Divide the fused image into blocks to obtain image blocks of the fused image.

Optionally, the fused image is uniformly divided into blocks to obtain image blocks of equal size of the fused image. For example, the fused image is divided into 9 image blocks of the same size through a 9*9 grid structure.

Optionally, the fused image is divided into blocks to obtain image blocks of the fused image, and sizes of the image blocks are different. For example, a 36*36 fused image is divided into blocks to obtain one 36*18 image block and two 18*18 image blocks.

Step 706: Irreversibly shuffle pixels in the at least two image blocks to obtain a pixel-confused facial image.

Irreversible shuffling refers to the inability to restore a pixel-confused facial image to a fused image. This step is to irreversibly shuffle the image blocks of the fused image, rather than irreversibly shuffle the fused image.

Optionally, the pixels in the image block are sequentially and irreversibly shuffled to obtain a pixel-confused facial image.

Optionally, the pixels in the image block are simultaneously irreversibly shuffled to obtain a pixel-confused facial image.

Step 707: Determine an object identifier corresponding to the facial image according to the pixel-confused facial image.

The object identifier is configured to mark an object with the face. The object identifier may further be other information specific to the object, which is used for defining an individual object from a group.

Optionally, the pixel-confused facial image is input into a facial recognition model and an object identifier corresponding to the facial image is determined according to the output of the facial recognition model. If the facial recognition model is not sensitive to whether the pixels of the facial image are shuffled, a pixel-confused facial image is used for training the facial recognition model, and a facial recognition model obtained by this training method can obtain an object identifier.

Optionally, the object identifier corresponding to the facial image is obtained when the object identifier corresponding to the facial image is not determined; the pixel-confused facial image is used as target facial image data; and the target facial image data and the object identifier are saved.

Step 708: Complete facial payment in response to the object identifier matching information of the first object account.

Optionally, if the object identifier does not match the information of the first object account, return to step 702.

In conclusion, in this embodiment, a facial image is taken from a video, and a fused image obtained by aligning and fusing a color map and a depth map of the facial image includes both two-dimensional information and depth information. After the fused image is divided into blocks, each pixel in the fused image can be better processed. After image blocks are shuffled, the two-dimensional information and the depth information in the fused image are protected, so that the two-dimensional information and the depth information cannot be restored, that is, information of an object is protected from being leaked. In addition, an object identifier can be determined according to a pixel-confused facial image, which will not affect the application of a basic facial recognition function.

The following is an apparatus embodiment of this application. For details not described in detail in the apparatus embodiment, reference may be made to corresponding record in the foregoing method embodiments. Details are not described herein again.

Figure 8:
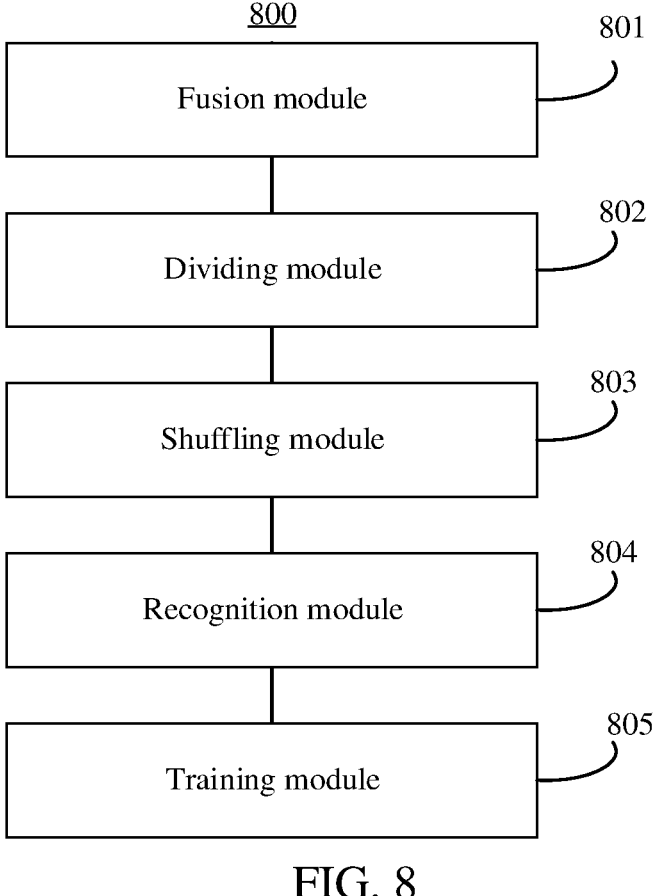
FIG. 8 is a schematic diagram of a facial recognition apparatus according to an exemplary embodiment of this application.

FIG. 8 is a schematic structural diagram of a facial recognition apparatus according to an exemplary embodiment of this application. The apparatus may be implemented as an entire computer device or a part of the computer device by using software, hardware, or a combination thereof. The apparatus 800 includes:

a fusion module 801, configured to fuse a color map and a depth map of a facial image to obtain a fused image of the facial image, the fused image including two-dimensional information and depth information of the facial image;

a dividing module 802, configured to divide the fused image into blocks to obtain at least two image blocks of the fused image;

a shuffling module 803, configured to irreversibly shuffle pixels in the at least two image blocks to obtain a pixel-confused facial image; and a recognition module 804, configured to determine an object identifier corresponding to the facial image according to the pixel-confused facial image.

In an optional design of this application, the fusion module 801 is further configured to obtain a first feature point in the color map and a second feature point in the depth map, where the first feature point has a correspondence to the second feature point; and fuse, in response to an overlapping degree of the first feature point and the second feature point being less than a preset value, the color map and the depth map to obtain the fused image of the facial image.

In an optional design of this application, the fusion module 801 is further configured to obtain, in response to an FOV of the color map being the same as an FOV of the depth map, the first feature point in the color map and the second feature point in the depth map.

In an optional design of this application, the fusion module 801 is further configured to obtain first internal and external parameters of a first camera corresponding to the color map and second internal and external parameters of a second camera corresponding to the depth map, where the first camera is configured to capture the color map and the second camera is configured to capture the depth map; and control, according to the first internal and external parameters and the second internal and external parameters, the FOV of the color map to be the same as the field of view of the depth map.

In an optional design of this application, the dividing module 802 is further configured to uniformly divide the fused image into blocks to obtain the at least two image blocks of equal size of the fused image.

In an optional design of this application, the shuffling module 803 is further configured to perform cat mapping on the pixels in the at least two image blocks to obtain pixel change coordinates in the at least two image blocks; and obtain, based on the pixel change coordinates in the at least two image blocks, the pixel-confused facial image.

In an optional design of this application, the recognition module 804 is further configured to obtain a third feature point in the fused image; encrypt the third feature point to obtain encrypted feature point data; transmit the encrypted feature point data and the pixel-confused facial image to a server; and receive the object identifier returned by the server, where the object identifier is obtained by the server according to decrypted encrypted feature point data and the pixel-confused facial image.

In an optional design of this application, the recognition module 804 is further configured to input the pixel-confused facial image and the third feature point in the fused image into a facial recognition model to obtain an eigenvector corresponding to facial image data; and determine, based on the eigenvector, the object identifier corresponding to the facial image.

In an optional design of this application, the recognition module 804 is further configured to obtain, in response to satisfying an identifier matching failure condition, the object identifier corresponding to the facial image; use the pixel-confused facial image and the encrypted feature point data as target facial image data; and save the target facial image data and the object identifier.

In an optional design of this application, the apparatus further includes a training module 805;

the training module 805 is configured to obtain a training data set, where the training data set includes a sample facial image and an actual object identifier, and the sample facial image has a correspondence to the actual object identifier; generate, according to the sample facial image, a pixel-confused sample facial image; input the pixel-confused sample facial image into the facial recognition model to obtain a sample eigenvector corresponding to the sample facial image; determine, based on the sample eigenvector, a sample object identifier corresponding to sample facial image data; and train the facial recognition model based on a difference between the actual object identifier and the sample object identifier.

In conclusion, in this embodiment, a fused image obtained by aligning and fusing a color map and a depth map of a facial image includes both two-dimensional information and depth information. After the fused image is divided into blocks, each pixel in the fused image can be better processed. After image blocks are shuffled, the two-dimensional information and the depth information in the fused image are protected, so that the two-dimensional information and the depth information cannot be restored, that is, information of an object is protected from being leaked. In addition, an object identifier can be determined according to a pixel-confused facial image, which will not affect the application of a basic facial recognition function.

Figure 9:
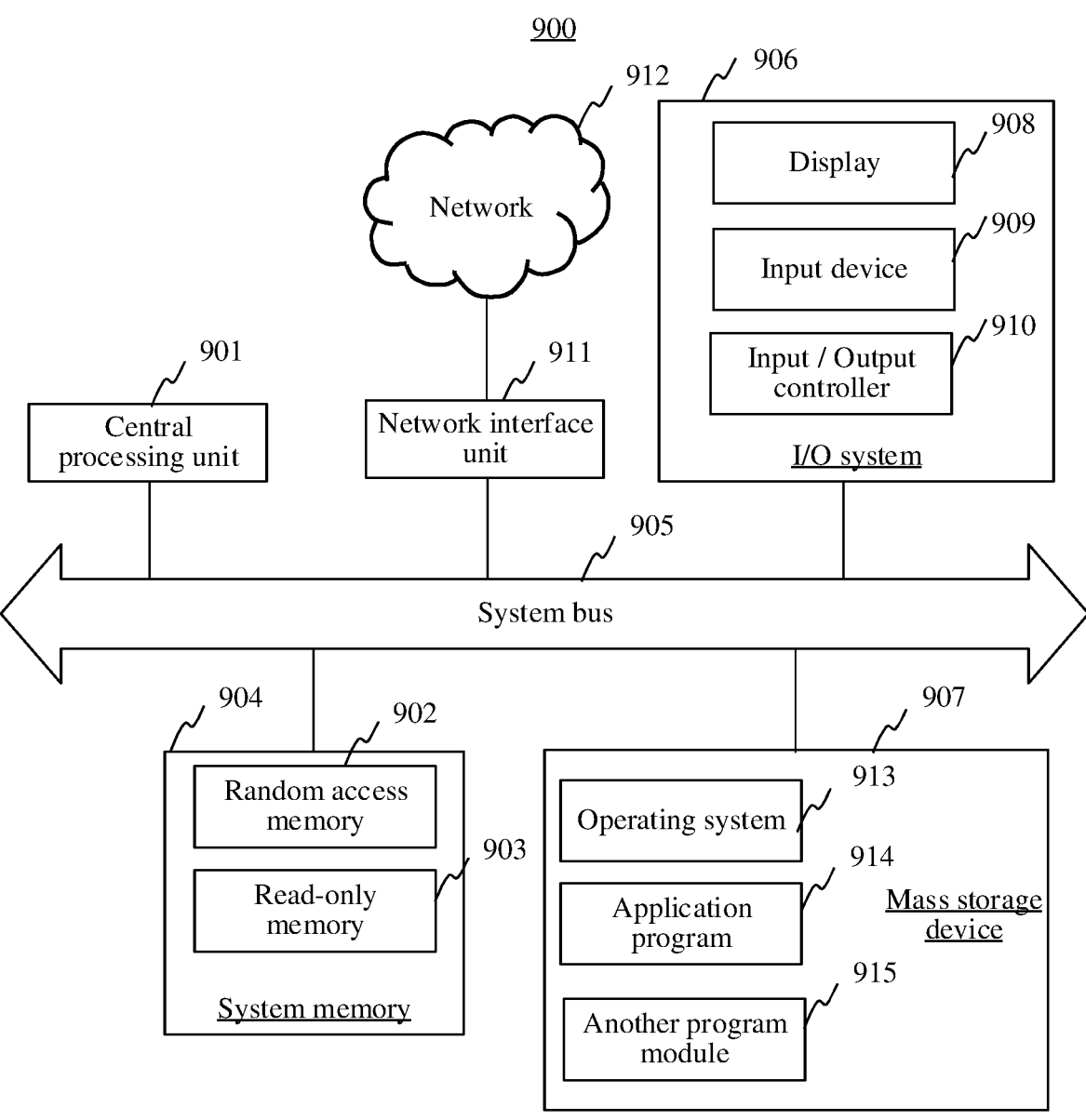
FIG. 9 is a schematic structural diagram of a server according to an exemplary embodiment of this application.

FIG. 9 is a schematic structural diagram of a server according to an embodiment of this application. Specifically, the server 900 includes a central processing unit (CPU) 901, a system memory 904 including a random access memory (RAM) 902 and a read-only memory (ROM) 903, and a system bus 905 connecting the system memory 904 to the central processing unit 901. The computer device 900 further includes a basic input/output (I/O) system 906 configured to transmit information between components in a computer, and a mass storage device 907 configured to store an operating system 913, an application program 914, and another program module 915.

The basic I/O system 906 includes a display 908 configured to display information and an input device 909, such as a mouse or a keyboard, configured to input information for an object. The display 908 and the input device 909 are both connected to the CPU 901 by using an input/output controller 910 connected to the system bus 905. The basic input/output system 906 may further include the input/output controller 910 configured to receive and process input from multiple other devices such as the keyboard, the mouse, or an electronic stylus. Similarly, the input/output controller 910 further provides an output to a display screen, a printer or another type of output device.

The mass storage device 907 is connected to the CPU 901 by using a mass storage controller (not shown) connected to the system bus 905. The mass storage device 907 and a computer-readable medium associated with the mass storage device 907 provide non-volatile storage for the server 900. That is, the mass storage device 907 may include a computer-readable medium (not shown) such as a hard disk or a compact disc read-only memory (CD-ROM) drive.

Generally, the computer-readable medium may include a computer storage medium and a communication medium. The computer storage medium includes volatile and non-volatile, removable and non-removable media that store information such as computer-readable instructions, data structures, program modules, or other data and that are implemented by using any method or technology. The computer storage medium includes a RAM, a ROM, an erasable programmable ROM (EPROM), an electrically erasable programmable ROM (EEPROM), a flash memory or another solid-state memory technology, a CD-ROM, a digital versatile disc (DVD) or another optical memory, a tape cartridge, a magnetic cassette, a magnetic disk memory, or another magnetic storage device. Certainly, a person skilled in the art may know that the computer storage medium is not limited to the foregoing types. The system memory 904 and the large-capacity storage device 907 may be collectively referred to as a memory.

According to various embodiments of this application, the server 900 may further be connected, by using a network such as the Internet, to a remote computer on the network and run. That is, the server 900 may be connected to a network 912 by using a network interface unit 911 that is connected to the system bus 905, or may be connected to a network of another type or a remote computer system (not shown) by using the network interface unit 911.

According to another aspect of this application, a computer-readable storage medium is further provided, storing at least one piece of program code, the at least one piece of program code being loaded and executed by a processor to implement the facial recognition method described above.

According to another aspect of this application, a computer program product or a computer program is further provided, including computer instructions, the computer instructions being stored in a computer-readable storage medium. A processor of a computer device reads the computer instructions from the computer-readable storage medium, and executes the computer instructions, to cause the computer device to perform the facial recognition method described above.

"Plurality of" mentioned in this specification means two or more. And/or describes an association relationship for describing associated objects and represents that three relationships may exist. For example, A and/or B may represent the following three cases: Only A exists, both A and B exist, and only B exists. The character "/" generally indicates an "or" relationship between the associated objects.

A person of ordinary skill in the art may understand that all or some of the steps of the foregoing embodiments may be implemented by using hardware, or may be implemented by a program instructing relevant hardware. The program may be stored in a computer-readable storage medium. The storage medium may be a ROM, a magnetic disk, an optical disc, or the like.

The foregoing descriptions are merely optional embodiments of this application, but are not intended to limit this application. Any modification, equivalent replacement, or improvement made within the spirit and principle of this application shall fall within the protection scope of this application.

What is claimed is:

1. A facial recognition method, applicable to a terminal, the method comprising:

fusing a color map and a depth map of a facial image to obtain a fused image of the facial image, the fused image comprising two-dimensional information and depth information of the facial image;

dividing the fused image into blocks to obtain at least two image blocks of the fused image;

irreversibly shuffling pixels in the at least two image blocks to obtain a pixel-confused facial image;

determining an object identifier corresponding to the facial image according to the pixel-confused facial image, wherein encrypted feature point data of the fused image is obtained for determining the object identifier;

obtaining, in response to satisfying an identifier matching failure condition, the object identifier corresponding to the facial image;

using the pixel-confused facial image and the encrypted feature point data as target facial image data; and saving the target facial image data and the object identifier.

2. The method according to claim 1, wherein fusing the color map and the depth map of the facial image to obtain the fused image of the facial image comprises:

obtaining a first feature point in the color map and a second feature point in the depth map, wherein the first feature point has a correspondence to the second feature point; and fusing, in response to an overlapping degree of the first feature point and the second feature point being less than a preset value, the color map and the depth map to obtain the fused image of the facial image.

3. The method according to claim 2, wherein obtaining the first feature point in the color map and the second feature point in the depth map comprises:

obtaining, in response to a field of view of the color map being the same as a field of view of the depth map, the first feature point in the color map and the second feature point in the depth map.

4. The method according to claim 3, further comprising:

obtaining first internal and external parameters of a first camera corresponding to the color map and second internal and external parameters of a second camera corresponding to the depth map, wherein the first camera is configured to capture the color map and the second camera is configured to capture the depth map; and controlling, according to the first internal and external parameters and the second internal and external parameters, the field of view of the color map to be the same as the field of view of the depth map.

5. The method according to claim 1, wherein dividing the fused image into the blocks to obtain the at least two image blocks of the fused image comprises:

uniformly dividing the fused image into the blocks to obtain the at least two image blocks of equal size of the fused image.

6. The method according to claim 1, wherein irreversibly shuffling pixels in the at least two image blocks to obtain the pixel-confused facial image comprises:

performing cat mapping on the pixels in the at least two image blocks to obtain pixel change coordinates in the at least two image blocks; and obtaining, based on the pixel change coordinates in the at least two image blocks, the pixel-confused facial image.

7. The method according to claim 1, further comprising:

obtaining a third feature point in the fused image;

encrypting the third feature point to obtain encrypted feature point data;

transmitting the encrypted feature point data and the pixel-confused facial image to a server; and receiving the object identifier returned by the server, wherein the object identifier is obtained by the server according to decrypted encrypted feature point data and the pixel-confused facial image.

8. The method according to claim 1, wherein determining the object identifier corresponding to the facial image according to the pixel-confused facial image comprises:

inputting the pixel-confused facial image and a third feature point in the fused image into a facial recognition model to obtain an eigenvector corresponding to facial image data; and determining, based on the eigenvector, the object identifier corresponding to the facial image.

9. The method according to claim 8, further comprising:

obtaining a training data set, wherein the training data set comprises a sample facial image and an actual object identifier, and the sample facial image has a correspondence to the actual object identifier;

generating, according to the sample facial image, a pixel-confused sample facial image;

inputting the pixel-confused sample facial image into the facial recognition model to obtain a sample eigenvector corresponding to the sample facial image;

determining, based on the sample eigenvector, a sample object identifier corresponding to sample facial image data; and training the facial recognition model based on a difference between the actual object identifier and the sample object identifier.

10. A facial recognition apparatus, comprising:

a memory storing a plurality of instructions; and a processor configured to execute the plurality of instructions, and upon execution of the plurality of instructions, is configured to:

fuse a color map and a depth map of a facial image to obtain a fused image of the facial image, the fused image comprising two-dimensional information and depth information of the facial image;

divide the fused image into blocks to obtain at least two image blocks of the fused image;

irreversibly shuffle pixels in the at least two image blocks to obtain a pixel-confused facial image;

determine an object identifier corresponding to the facial image according to the pixel-confused facial image, wherein encrypted feature point data of the fused image is obtained for determining the object identifier;

obtaining, in response to satisfying an identifier matching failure condition, the object identifier corresponding to the facial image;

using the pixel-confused facial image and the encrypted feature point data as target facial image data; and saving the target facial image data and the object identifier.

11. The apparatus according to claim 10, wherein in order to fuse the color map and the depth map of the facial image, the processor, upon execution of the plurality of instructions, is configured to:

obtain a first feature point in the color map and a second feature point in the depth map, wherein the first feature point has a correspondence to the second feature point; and fuse, in response to an overlapping degree of the first feature point and the second feature point being less than a preset value, the color map and the depth map to obtain the fused image of the facial image.

12. The apparatus according to claim 11, wherein in order to obtain the first feature point in the color map and the second feature point in the depth map, the processor, upon execution of the plurality of instructions, is configured to:

obtain, in response to a field of view of the color map being the same as a field of view of the depth map, the first feature point in the color map and the second feature point in the depth map.

13. The apparatus according to claim 12, wherein the processor, upon execution of the plurality of instructions, is further configured to:

obtain first internal and external parameters of a first camera corresponding to the color map and second internal and external parameters of a second camera corresponding to the depth map, wherein the first camera is configured to capture the color map and the second camera is configured to capture the depth map; and control, according to the first internal and external parameters and the second internal and external parameters, the field of view of the color map to be the same as the field of view of the depth map.

14. The apparatus according to claim 10, wherein in order to divide the fused image into the blocks to obtain the at least two image blocks of the fused image, the processor, upon execution of the plurality of instructions, is configured to:

uniformly divide the fused image into blocks to obtain the at least two image blocks of equal size of the fused image.

15. The apparatus according to claim 10, wherein in order to irreversibly shuffle the pixels in the at least two image blocks to obtain the pixel-confused facial image, the processor, upon execution of the plurality of instructions, is configured to:

perform cat mapping on the pixels in the at least two image blocks to obtain pixel change coordinates in the at least two image blocks; and obtain, based on the pixel change coordinates in the at least two image blocks, the pixel-confused facial image.

16. The apparatus according to claim 10, wherein the processor, upon execution of the plurality of instructions, is further configured to:

obtain a third feature point in the fused image;

encrypt the third feature point to obtain encrypted feature point data;

transmit the encrypted feature point data and the pixel-confused facial image to a server; and receive the object identifier returned by the server, wherein the object identifier is obtained by the server according to decrypted encrypted feature point data and the pixel-confused facial image.

17. The apparatus according to claim 10, wherein in order to determine the object identifier corresponding to the facial image according to the pixel-confused facial image, the processor, upon execution of the plurality of instructions, is configured to:

input the pixel-confused facial image and a third feature point in the fused image into a facial recognition model to obtain an eigenvector corresponding to facial image data; and determine, based on the eigenvector, the object identifier corresponding to the facial image.

18. A non-transitory computer-readable storage medium, storing a plurality of instructions executable by a processor, and upon execution by the processor, the plurality of instructions cause the processor to:

fuse a color map and a depth map of a facial image to obtain a fused image of the facial image, the fused image comprising two-dimensional information and depth information of the facial image;

divide the fused image into blocks to obtain at least two image blocks of the fused image;

irreversibly shuffle pixels in the at least two image blocks to obtain a pixel-confused facial image;

determine an object identifier corresponding to the facial image according to the pixel-confused facial image, wherein encrypted feature point data of the fused image is obtained for determining the object identifier;

obtaining, in response to satisfying an identifier matching failure condition, the object identifier corresponding to the facial image;

using the pixel-confused facial image and the encrypted feature point data as target facial image data; and saving the target facial image data and the object identifier.

19. The non-transitory computer-readable storage medium according to claim 18, wherein in order to fuse the color map and the depth map of the facial image, the plurality of instructions, upon execution by the processor, is configured to cause the processor to:

obtain a first feature point in the color map and a second feature point in the depth map, wherein the first feature point has a correspondence to the second feature point; and fuse, in response to an overlapping degree of the first feature point and the second feature point being less than a preset value, the color map and the depth map to obtain the fused image of the facial image.

\* \* \* \* \*